Sept. 5, 1967 O. L. CARTER 3,339,641
VIBRATING PLOWS
Filed Dec. 23, 1964 4 Sheets-Sheet 1
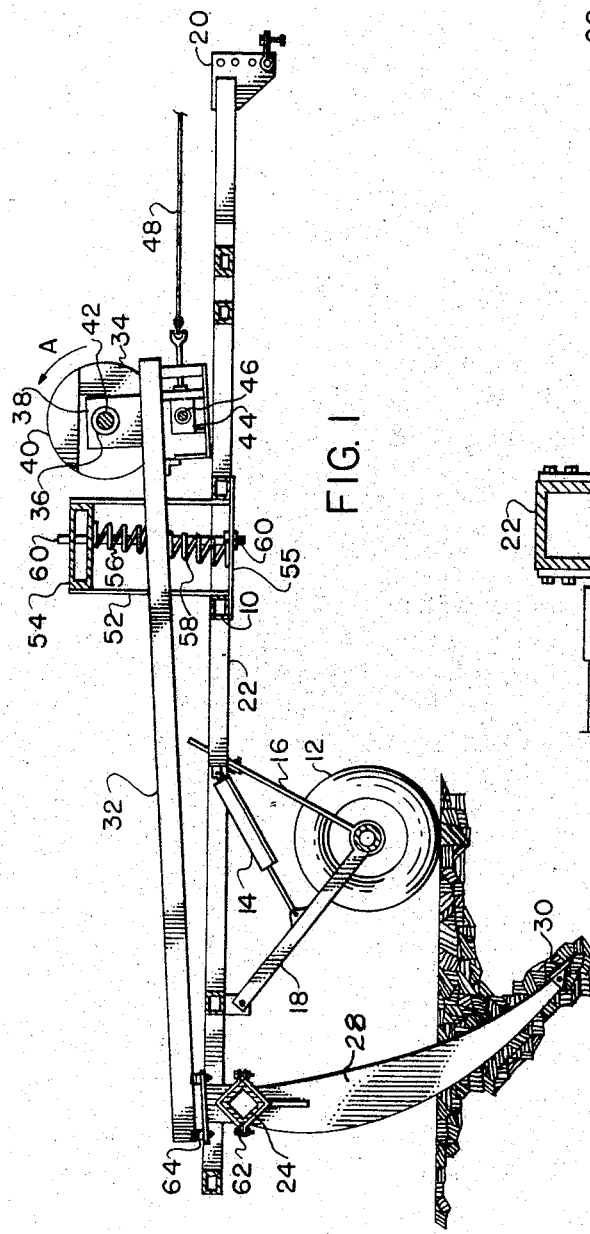
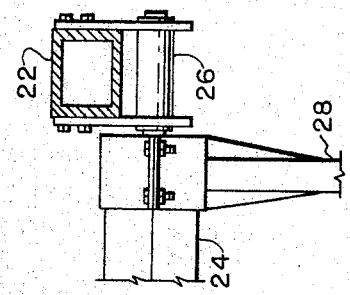
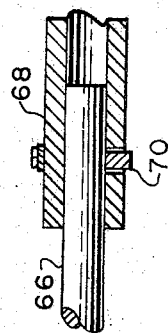
ORVIL L. CARTER
INVENTOR.

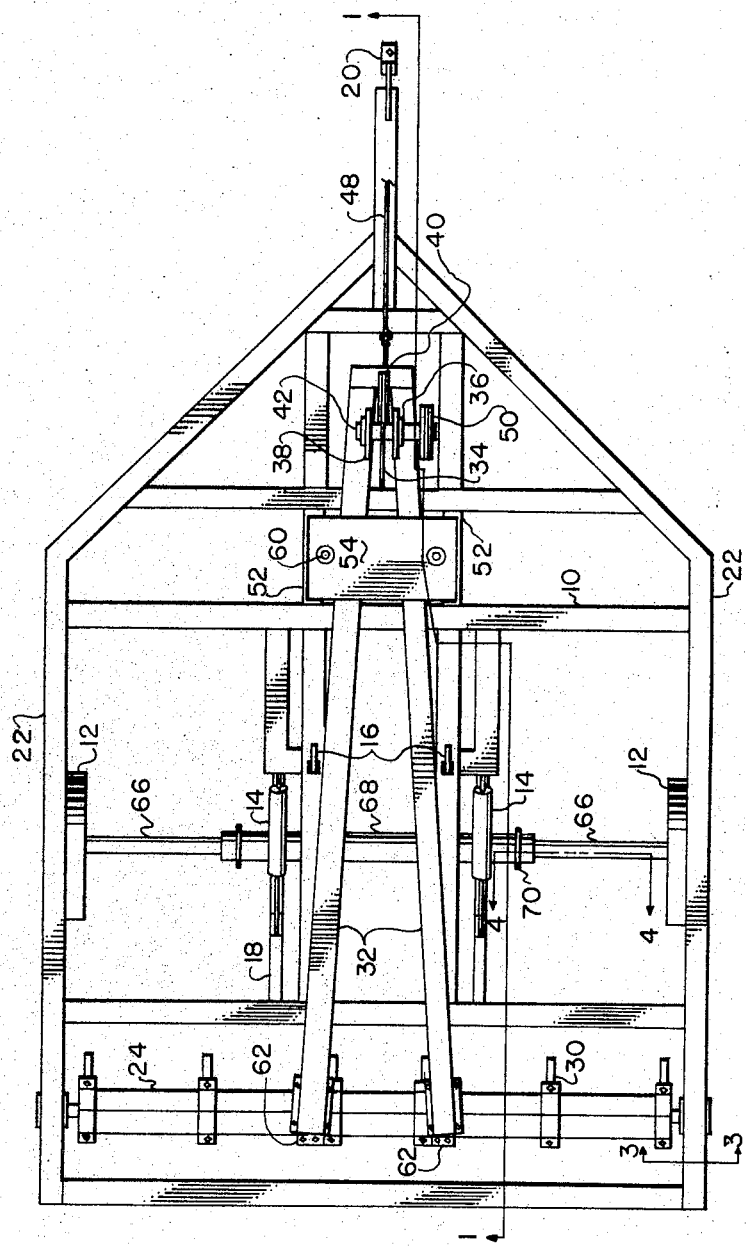

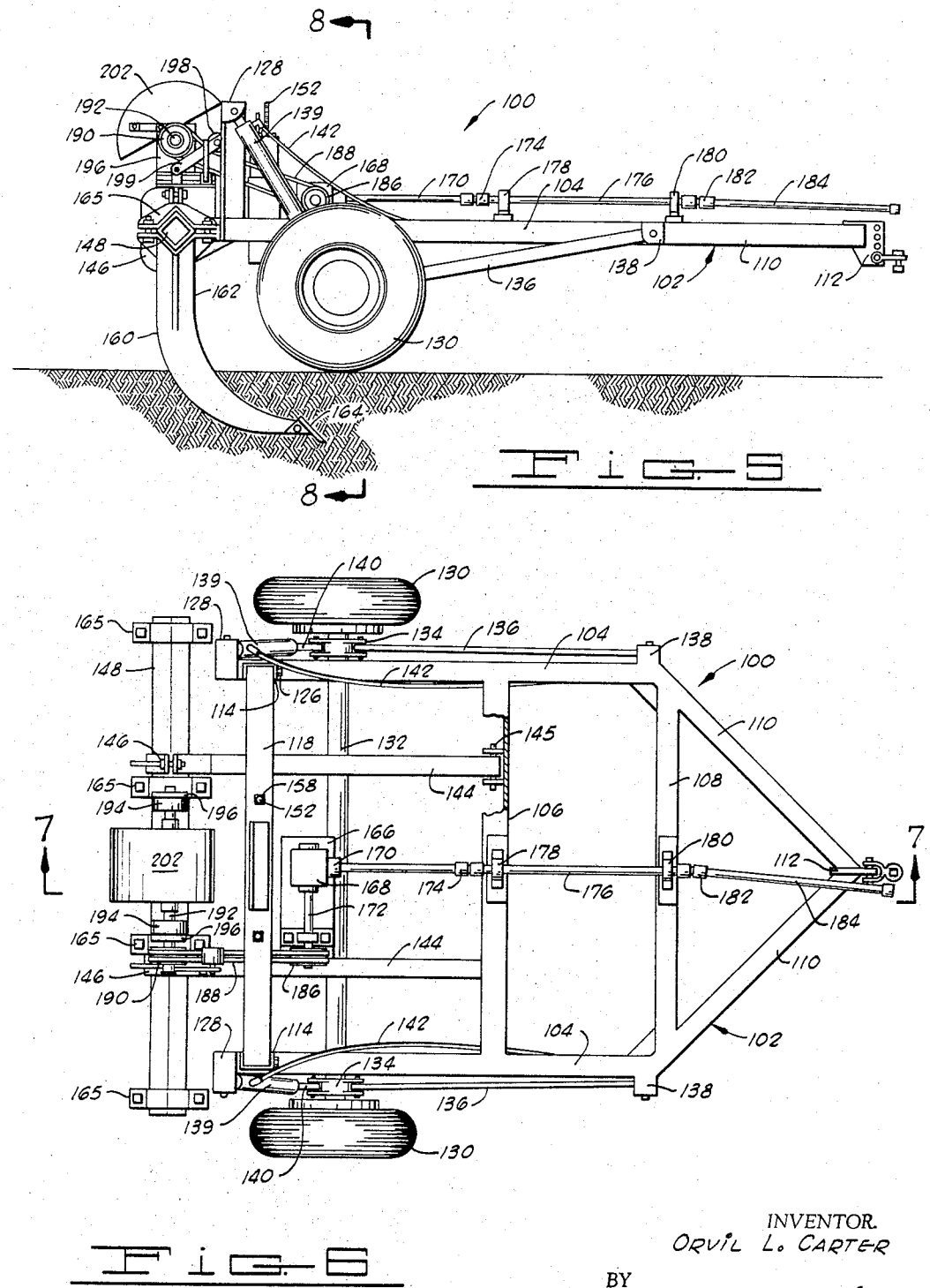

3,339,641
VIBRATING PLOWS
Orvil L. Carter, 1125 S. Amherst,
Perryton, Tex. 79070
Filed Dec. 23, 1964, Ser. No. 444,880
9 Claims. (Cl. 172—40)

This application is a continuation-in-part of my co-pending application, Ser. No. 344,313, filed Feb. 12, 1964, for Vibrating Plows, now abandoned.

This invention relates to earth working implements, and more particularly to vibrating plows.

In present day agriculture, it has become the practice to cultivate the land deeper than in previous years. With deeper cultivation, greater power is required. This power can be reduced by vibrating the earth working implement.

The earth working implement may be vibrated by mounting it on a spring shank and allowing it to vibrate naturally, or it may be vibrated by inducing vibration. This invention relates to plows wherein the shank is vibrated by induced vibrations.

Generally, this invention relates to an improved plow wherein the tool bar carrying one or more plow members is mounted in the frame for rotation about the axis of the tool bar. A radial arm is attached to the tool bar and a vibrator is mounted on the arm and driven by a power takeoff of the tractor or draft vehicle.

Another aspect of the invention contemplates an improved plow wherein the tool bar is attached to the rearmost end of the arm and the front end of the arm is pivotally connected with the frame. The vibrator is mounted on the arm near the rear end thereof and driven by the power takeoff of the tractor.

An object of the invention is to improve the mechanism for inducing vibration in plows.

Further objects of the invention are to achieve the above with a device that is sturdy, compact, durable, simple, versatile, and reliable, yet inexpensive and easy to manufacture and operate.

Still further objects are to achieve the above with a method that is rapid, inexpensive, and easy for inexperienced, unskilled people to perform.

The specific nature of the invention as well as other objects, uses, and advantages thereof will clearly appear from the following description and from the accompanying drawings, the different views of which are not necessarily to the same scale, in which:

FIG. 1 is a side-sectional view of a plow constructed in accordance with the invention, this sectional view being taken along line 1—1 of FIGURE 2 of the drawings.

FIG. 2 is a top view of the plow;

FIG. 3 is a sectional view taken on line 3—3 of FIG. 2;

FIG. 4 is a sectional detail of the telescoping axle, such sectional view being taken along line 4—4 of FIGURE 2.

FIG. 5 is a side elevation view of another embodiment of plow also constructed in accordance with the invention;

FIG. 6 is a top view of the plow in FIG. 5;

EMBODIMENT OF FIGS. 1–4

Figure 7:
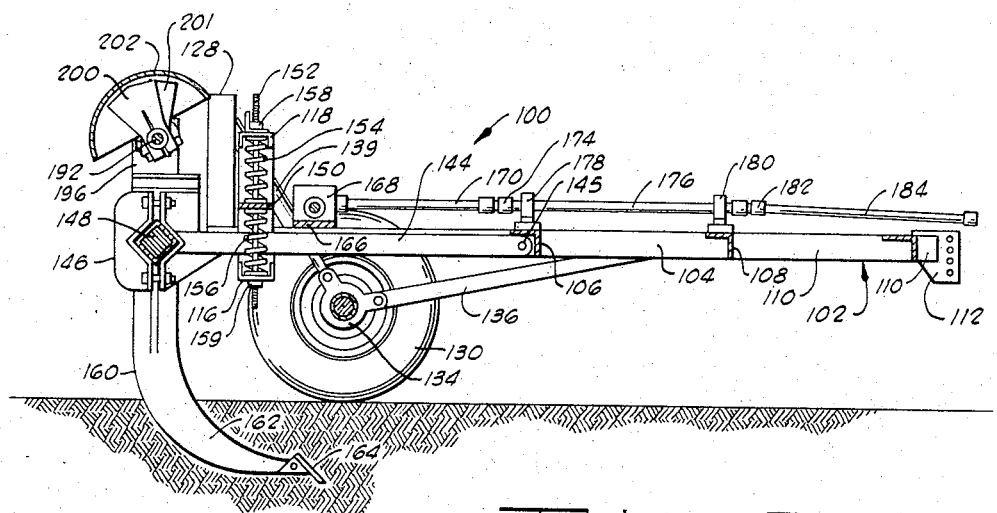
FIG. 7 is a side sectional view of the plow taken along the line 7—7 of FIG. 6; and, FIG. 8 is a sectional view of the plow of FIG. 5 taken along the line 8—8 of FIG. 5.

Referring to FIGS. 1–4 of the drawings, the plow illustrated therein includes a frame 10 having two ground engaging gauge wheels 12, that are actuated by hydraulic cylinders. Also, gauge arms 16 interconnect the frame 10 and wheel arms 18 attached to the wheels 12. The frame 10 has a hitch 20 by which the plow is attached to a towing tractor or draft vehicle (not shown).

The frame 10 also includes two beams or side members 22 on either side of the frame 10 extending generally parallel to the direction of the draft. A tool bar 24 is journaled in the beams 22 by bearings 26. The tool bar 24 is horizontal, normal to the direction of draft, and mounted for rotation about its axis. Several shanks or plow members 28 are attached to the tool bar 24. On the bottom of each shank 28 is an earth working implement or plow point 30. The shanks 28 are rigidly attached to the tool bar 24 in a conventional and well known manner.

A pair of arms 32 extend radially forward from the tool bar 24 in a direction generally parallel to the direction of draft. The arms 32 extend between a pair of vertically spaced bars or cross members 54 and 55 that are supported by two spaced, vertical channels 52 each of which is mounted on the frame 10. The two vertical channels 52 form a track for the cross members 54 and 55 so that the vertical spacing between the members 54 and 55 can be changed if desired.

One or more helical upper springs 56 extend between the member 54 and one of the arms 32. Similarly, one or more lower helical springs 58 extend between the lower bar 55 and one of the arms 32. Two elongated, threaded bolts 60 extend through the helical springs 56 and 58 and through threaded openings in the bars 54 and 55 so that rotation of the bolts 60 will draw the bars closer together or spread them apart to adjust the tension on the springs 56 and 58. The springs 56 and 58 together with the bars 54 and 55 comprise a resilient support for the arms 32 in the frame 10.

A pair of brackets 38 are attached to the arms 32 near the foward end thereof. A pair of aligned bearings 36 are attached to the brackets 30. A shaft 42 is mounted for rotation in the bearings 36 and supports a disc 34. The disc 34 has an eccentric weight 40 mounted thereon. A right angle gear box 44 is attached to the arms 32 immediately below the brackets 38. The right angle gear box 44 includes an output shaft 46 that rotates in response to the rotation of the connecting drive shaft 48 which extends to the power takeoff of the draft vehicle (not shown).

The shaft 42 is driven by the shaft 46 through one or more V-belts 50 which run on sheaves attached to the shafts 42 and 46. The drive from the drive shaft 48 to the shaft 42 is so constructed that the disc 34 rotates in the direction of arrow "A," as seen in FIGURES 1 and 3. As shown in FIG. 1, the disc 34 rotates in a counterclockwise direction. Expressed otherwise, when the weight 40 is below the shaft 42, the weight is moving in a forward direction. Therefore, it will be seen that the rotating eccentric weight 40 forms a means for vibrating arm 32 and, thus the earth working implement 30. It has been found that rotating the eccentric 40 at about 700 r.p.m. gives good results.

The rear end of the arms 32 are bolted to clamps 62 which are in turn bolted to the tool bar 24. The clamps 62 have two contact surfaces which are spaced apart in the direction of the arms 32. Shims 64 are positioned between the contact surfaces of the clamps 62 and the arms 32 to provide means for adjusting the angle of the tool bar 24 and the shanks 28 relative to the arms 32.

As shown most clearly in FIG. 4, gauge wheels 12 are mounted on stubs 66 telescoped in a tubular axle 68. A clamp 70 retains the stub 66 in adjusted position in the axle 68. The wheel support arms 18 are pivotally attached at one end to the tubular axle 68 and are pivotally attached at the other end to the frame 10.

The distance from the tool bar 24 to the shaft 42 is approximately twice the distance from the tool bar to the earth working implement 30. Stated otherwise, the arm 32 is approximately twice as long as the shanks 28. It is desirable to have the arm 32 longer than the shanks 28 to provide better control and better vibration of the plow.

Also, it is preferable to rotate the shaft 42 in the direction described. However, rotation in the opposite direction does not affect the operability of the plow.

Different types of soil containing the same amount of moisture, and the same type of soil having different amounts of moisture will plow differently, therefore, it has been found to be highly desirable to be able to adjust the amount of stress within the helical springs 56 and 58 and, as a result thereof, to adjust the amount of vibration of the shanks 28. The ability to adjust the stress within the springs 56 and 58 results in the more efficient operation of the plow under the varying operating conditions previously mentioned.

All of the shields and covers for the mechanism have not been shown, but will be understood by those skilled in the art as suitable shields and covers could be provided if desired.

EMBODIMENT OF FIGS. 5–8

Refering now to the FIGURES 5, 6, 7, and 8, shown therein and generally designated by the reference character 100 is another embodiment of vibrating plow also constructed in accordance with the invention. As shown therein, the plow 100 includes a frame 102 consisting of a pair of spaced side frame members 104, a pair of cross members 106 and 108 connecting the side frame members 104, and a pair of angularly disposed members 110 joined at the rear ends thereof to the cross members 108 and the side frame members 104 and connected at their front ends with a connecting member 112. The connecting member 112 is arranged to be attached to the draft vehicle (not shown).

Figure 8:
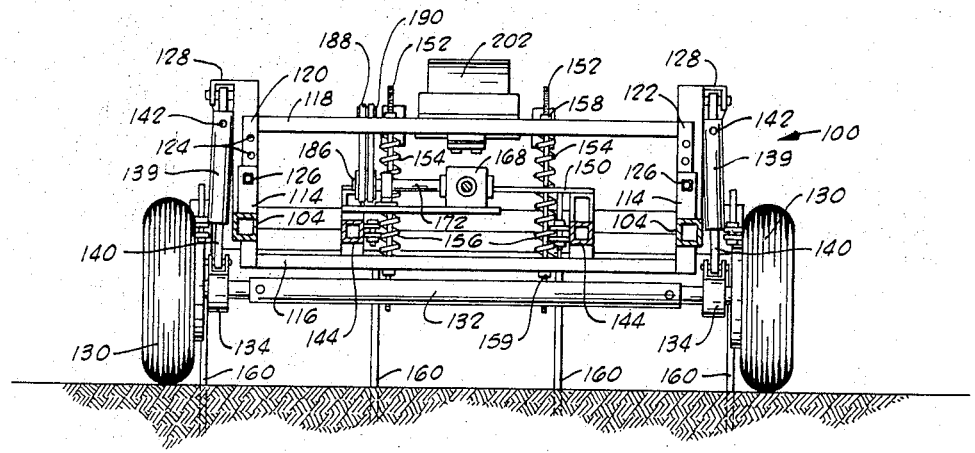

As shown most clearly in FIGS. 6 and 8, the frame 102 also includes a vertically extending channel member 114 mounted near the rear end portion of each of the side members 104. The lower ends of the vertically extending members 114 are connected by a cross member 116.

A cross member 118 having downturned ends 120 and 122 (see FIG. 8) extends between the upper ends of the vertical members 114. The ends 120 and 122 of the cross member 118 are arranged to telescope within the vertical members 114 and are provided with a plurality of holes 124 through which bolts 126 extend to position the cross member 118 in the vertical members 114. The arrangement is such that the desired vertical spacing between the cross members 116 and 118 may be fixed after adjustment by positioning the bolts 126 in the holes 124.

A vertical member 128 is mounted on the rear portion of each of the side members 104 behind the vertical members 114. The purpose of the vertical members 128 will be explained more fully hereinafter.

Ground engaging wheels 130 are rotatably mounted on an axle 132. The axle 132 may be constructed in the same manner as the axle 68 of the embodiment of FIG. 1 if desired. A clevis 134 is mounted on the axle 132 adjacent each of the wheels 130. One end of a wheel support member 136 is pivotally attached to the clevis 134 and the other end of the member 136 is pivotally connected with a bracket 138 attached to each of the side members 104. Thus, it can be seen that the wheels 130 are pivotally mounted on the frame 102.

The vertical members 128 are provided to pivotally support the upper end of a hydraulic cylinder 139. A piston (not shown) is movably positioned within the hydraulic cylinder 139 and a rod 140 connected with the piston extends from the lower end of the hydraulic cylinder 139. The lower end of the rod 140 is pivotally attached to the clevis 134. Hydraulic hoses 142 extend from the cylinder 139 to a valve (not shown) mounted on the towing or draft vehicle (not shown). Hydraulic fluid supplied through the hoses 142 to the cylinder 139 positions the pistons (not shown) and rods 140 to adjust the relative height of the frame 102 with respect to the wheels 130.

As illustrated in FIGS. 6 and 7, a pair of arms 144 have their front ends pivotally connected at 145 with the cross member 106 and extend rearwardly therefrom between the cross members 116 and 118. The rearmost ends of the arms 144 are connected by means of clamps 146 with a transversely extending tool bar 148. The tool bar 148 is generally rectangular in cross-section and can be constructed in any desired length.

As illustrated in FIGS. 7 and 8, a cross member 150 is attached to the arms 144. A pair of threaded bolts 152 extend through the cross members 116 and 118 and through an opening (not shown) in the cross member 150. Encircling the screws 152 are a pair of coiled springs 154 disposed between the cross members 118 and 150. Similarly, a pair of coiled springs 156 are disposed between the cross members 116 and 150. Threaded nuts 158 on the screws 152 engage the upper surface of the cross member 118 to aid in adjusting and locking the desired tension in the springs 154. Similarly, threaded nuts 159 are positioned on the screws 152 and engage the lower surface of the cross member 116 to aid in adjusting and locking the desired tension in the springs 156.

A change in tension in the springs 154 and 156 is accomplished by repositioning the cross member 118 in the vertical members 114 as previously described. The arrangement of the cross members 116 and 118 and 150 and the springs 154 and 156 is such that the arms 144 are resiliently supported in the frame 102, whereby the arms 144 can move relative to the cross members 116 and 118 about the pivot 145 in the cross member 106.

A plurality of identical plow members 160 are mounted in spaced relation along the elongated tool bar 148. As shown most clearly in FIG. 5, each of the plow members 160 includes a shank portion 162 and a removable plow point 164. Mounted on the upper end of the shank portion 162 is a clamp 165, that removably attaches the plow member 160 rigidly to the tool bar 148.

Mounted on a plate 166 connected to one of the arms 144 is a right-angle drive mechanism 168 that includes an input shaft 170 and an output shaft 172. The input shaft 170 is connected by a telescoping U-joint 174 to an intermediate shaft 176. One end of the intermediate shaft 176 is mounted in a pillow block bearing 178 mounted on the cross member 106 and the other end is mounted in a pillow block bearing 180 mounted on the cross member 108. The other end of the intermediate shaft 176 is connected with a telescoping U-joint 182 that is also connected with one end of a shaft 184. The shaft 184 is adapted to be connected to the power takeoff (not shown) of the draft vehicle (not shown).

Mounted on the end of the output shaft 172 is a sheave 186 that is operably connected by one or more V-belts 188 with a sheave 190 mounted on a shaft 192. The shaft 192 is journaled in bearings 194 (see FIG. 6) that are mounted on brackets 196 attached to the tool bar 148. An idler pulley 198 (see FIG. 5) is adjustably mounted on an arm 199 to the bracket 196 and is arranged to exert a force on the V-belts 188 so that they will not slip on the sheaves 186 and 190.

As shown in FIG. 7, eccentric weights 200 and 201 are attached to the shaft 192 and are rotatable therewith. The weights 200 and 201 are independently adjustable on the shaft 192 to vary the center of mass whereby the force exerted on the arms 144 will be varied. Changing the force on the arms 144 provides a means of adjusting the amount of vibration imparted by the weights 200 and 201 to the plow members 160.

A hood or cover 202 has been suitably mounted on the brackets 196 to prevent accidental injury to anyone near the rotating eccentric weight 200.

To transport the plow 100 from one location to the other, the valve (not shown) on the draft vehicle (not shown) is opened to introduce hydraulic fluid through the hoses 142 into cylinder 139. As fluid enters the cylinder 139, it moves the piston (not shown) and the rod 140 connected therewith downwardly, lifting the frame 102 and the support arms 144 upwardly relative to the wheels 130. The valve is kept open until the plow member 160 is lifted clear of the surface of the ground. In this position, the plow 100 can be easily moved from one area to the other.

Upon arriving in an area wherein plowing is to be performed, the valve (not shown) is opened to another position to permit the fluid to flow from the hydraulic cylinder 139 through the conduit 142, thereby permitting the cylinder 139 to move relatively downwardly with respect to the rod 148 and the wheels 130. When the plow point 164 engages the ground, the draft vehicle (not shown) is started forward, pulling the plow 100 therewith. As the plow 100 moves in a forward direction, the plow member 160 will continue to dig deeper into the ground. Upon reaching the desired depth in the ground, the valve (not shown) will be closed trapping fluid in the hydraulic cylinder 139, thereby preventing further relative movement between the frame 102 and the surface of the ground. After completion of the foregoing, the penetration of the plow member 160 is adjusted to the desired depth.

As the plow 100 is pulled in a forward direction, the power takeoff (not shown) of the draft vehicle (not shown) is actuated to cause the shafts 184, 176 and 170 to rotate. Rotation of these shafts results in the rotation of the output shaft 172 and the rotation of the shaft 192 by virtue of the V-belts 188 extending therebetween. Rotation of the shaft 192 causes the rotation of the eccentric weight 200.

Due to the eccentricity of the weight 200, a vibration is set up that is transmitted to the tool bar 148, the arms 144, and the plow member 160. The vibration caused thereby results in the oscillation of the arms 144 about the pivot 145 compressing and extending the springs 154 and 156. As previously mentioned, the magnitude of the vibration can be controlled by adjusting the tension on the springs 154 and 156 until the desired movement of the plow member 160 is obtained.

It should be apparent from the foregoing detailed description that a novel apparatus has been described that results in the inducing of vibrations into a plow member. Such vibrations of the plow member have been found to substantially reduce the power requirements needed to pull the plow member through the soil during relatively deep plowing.

The embodiments described herein are presented by way of example only. It should be understood that many changes and modifications can be made thereto without departing from the spirit of the invention or the scope of the annexed claims.

What I claim is:

1. Vibrating plow apparatus for use in connection with a draft vehicle, said apparatus comprising:
 an elongated frame having
  a front end arranged for connection with the draft vehicle,
  a rear end,
  left and right side members, and
  a pair of vertically-spaced cross members extending between said side members;
 a pair of spaced, rotatable ground engaging wheels;
 a wheel support member for each of said wheels pivotally connecting said wheels with said frame;
 a pair of cylinder members, each of said cylinder members having an end pivotally connected with the respective side member of said frame;
 a piston reciprocally positioned in each cylinder member and having a rod portion projecting therefrom pivotally connected with the respective wheel support member;
 a tool bar extending transversely with respect to the elongation of said frame;
 support means carrying said tool bar, said support means being connected for pivotal movement relative to said frame, and including
  a pair of arms having one end connected with said tool bar and extending toward the front end of said frame between said vertically-spaced cross members,
  a pair of coiled springs disposed between said arms and the uppermost of said vertically-spaced cross members, and
  a pair of coiled springs disposed between said arms and the lowermost of said vertically-spaced cross members, whereby said arms are resiliently supported between said vertically-spaced cross members;
 at least one plow member rigidly connected with said tool bar; and,
 vibration means mounted on said support means to vibrate said plow member, said vibration means including,
  a rotatable shaft journalled in said support arms,
  an eccentric member mounted on said shaft and rotatable therewith, and
  means for rotating said shaft.

2. Vibrating plow apparatus for use in connection with a draft vehicle, said apparatus comprising:
 an elongated frame having left and right side members, a front end, and a rear end, said front end being arranged for connection to the draft vehicle;
 a pair of spaced, rotatable ground engaging wheels pivotally attached to said frame;
 an elongated tool bar extending between said left and right side members and journalled therein;
 a pair of arms having one end connected with said tool bar and extending toward the front of said frame;
 resilient means disposed between said frame and arms;
 a plow member rigidly connected with said tool bar; and,
 means mounted on said arms for vibrating said arms and said plow member.

3. The vibrating plow apparatus of claim 2 wherein said frame also includes a pair of vertically-spaced cross members located between said vibration means and said tool bar; and wherein said resilient means includes:
 at least one first spring member disposed between said arms and the uppermost of said vertically-spaced cross members; and,
 at least one second spring member disposed between said arms and the lowermost of said vertically-spaced cross members, whereby said arms are resiliently supported between said vertically-spaced cross members.

4. Vibrating plow apparatus for use in connection with a draft vehicle, said apparatus comprising:
 an elongated frame having
  a front end arranged for connection with the draft vehicle,
  a rear end,
  left and right elongated side members, and
  a pair of vertically-spaced cross members between said side members;
 a pair of spaced, rotatable ground engaging wheels;
 a wheel support member for each of said wheels pivotally connecting each wheel with a respective side member of said frame;
 a pair of cylinder members, each of said cylinder members having one end pivotally connected with one of said side members;
 a piston reciprocally positioned in each cylinder and having a rod portion projecting therefrom pivotally connected with the respective wheel support member;
 a tool bar extending between said side members near the rear end thereof and pivotally journalled therein;
 a pair of arms having one end connected with said tool bar and extending toward the front of said frame and between said vertically-spaced cross members;

a pair of coiled springs disposed between said arms and the uppermost of said vertically-spaced cross members;

a pair of coiled springs disposed between said arms and the lowermost of said vertically-spaced cross members, whereby said arms are resiliently supported between said vertically-spaced cross members;

at least one plow member rigidly mounted on said tool bar; and, vibration means mounted on said arms in front of said cross members to vibrate said plow member, said vibration means including:
 a rotatable shaft, journalled in said arms,
 an eccentric member mounted on said shaft and rotatable therewith, and
 means for rotating said shaft.

5. Vibrating plow apparatus for use in connection with a draft vehicle, said apparatus comprising:

an elongated frame having
 a front end arranged for connection with the draft vehicle,
 a rear end,
 left and right elongated side members, and
 a pair of vertically-spaced cross members extending between said side members;

a pair of spaced, rotatable ground engaging wheels;

a wheel support member for each of said wheels pivotally connecting each wheel with a respective side member of said frame;

a pair of cylinder members, each of said cylinder members having one end pivotally connected with one of said side members;

a piston reciprocally positioned in each cylinder member and having a rod portion projecting therefrom pivotally connected with the respective wheel support member;

an elongated tool bar disposed near the rear end of said frame and extending transversely with respect to the elongation of said frame;

a pair of arms having a rear end connected with said tool bar and extending toward the front of said frame and between said vertically-spaced cross members, said arms having a front end pivotally connected with said frame;

a pair of coiled springs disposed between said arms and the uppermost of said vertically-spaced cross members;

a pair of coiled springs disposed between said arms and the lowermost of said vertically-spaced cross members, whereby said arms are resiliently supported between said vertically-spaced cross members;

a plow member rigidly mounted on said tool bar; and, vibration means mounted on said arms in front of said cross members to vibrate said plow member, said vibration means including:
 a rotatable shaft journalled in said support arms,
 an eccentric member mounted on said shaft and rotatable therewith, and
 means for rotating said shaft.

6. A vibrating plow apparatus for use in connection with a draft vehicle, said apparatus comprising:

an elongated frame having left and right side members, a front end and a rear end, said front end being arranged for connection to a draft vehicle, said frame further having a pair of vertically-spaced cross members;

a pair of spaced, rotatable ground engaging wheels pivotally attached to said frame;

a tool bar extending transversely with respect to the elongation of said frame;

a pair of arms extending between the cross members of said frame toward the front end of said frame and connected at their rearmost ends with said tool bar;

at least one first spring member disposed between said arms and the uppermost of said vertically-spaced cross members;

at least one spring member disposed between said arms and the lowermost of said vertically-spaced cross members, the arrangement of said first and second spring members and pair of arms being such that said arms are resiliently supported between said vertically-spaced cross members;

at least one plow member rigidly connected with said tool bar; and vibration means mounted on said pair of arms to vibrate said plow member.

7. Vibrating plow apparatus for use in connection with a draft vehicle, said apparatus comprising:

an elongated frame having left and right side members, a front end, and a rear end, and further having a pair of vertically-spaced cross members near the rear end thereof extending between said side members, the front end of said frame being arranged for connection to a draft vehicle;

a pair of spaced, rotatable ground engaging wheels pivotally attached to said frame;

an elongated tool bar disposed near the rear end of said frame and extending transversely with respect to the elongation of said frame;

a pair of arms extending between said vertically-spaced cross members and each having a rear end connected with said tool bar and extending toward the front end of said frame, said arms having a front end pivotally connected with said frame;

at least one first spring member disposed between said arms and the uppermost of said vertically-spaced cross members;

at least one second spring member disposed between said arms and the lowermost of said vertically-spaced cross members, whereby said arms are resiliently supported between said vertically-spaced cross members;

a plow member rigidly connected with said tool bar; and vibration means mounted on said arms near the rear end thereof to cause said plow member to vibrate.

8. A vibrating plow device comprising:

an elongated frame having a front end and a rear end, said frame further including a pair of vertically-spaced cross members extending transversely with respect to the elongation of said frame;

a pair of spaced, rotatable ground engaging wheels pivotally attached to said frame;

arm means extending between said cross members toward the front end of said frame;

a tool bar extending transversely with respect to the elongation of said frame and connected to the rearmost ends of said arm means;

said arm means being pivotally attached to said frame;

resilient means interposed between said arm means and said vertically-spaced cross members for resiliently opposing up and down movement of said arm means with respect to said vertically-spaced cross members;

at least one plow member rigidly connected with said tool bar; and vibration means mounted on said arm means to vibrate said plow member.

9. Vibrating plow apparatus comprising:

an elongated frame having a left and right side, and having a front end and a rear end, said frame including a pair of vertically-spaced cross members extending transversely with respect to the elongation of said frame, and said frame further having a front end adapted for connection to a frame-pulling vehicle;

a pair of spaced rotatable ground engaging wheels pivotally attached to said frame;

an elongated tool bar disposed adjacent the rear end of said frame and extending transversely with respect to the elongation of said frame;

arms means having a rear end connected with said tool bar and extending toward the front end of said frame from said tool bar, said arm means having a front end pivotally connected with said frame;

springs positioned between said arm means and each of said vertically-spaced cross members whereby said arm means is resiliently supported between said vertically-spaced cross members;

a plow member rigidly connected with said tool bar; and vibration means mounted on said arm means near the rear end thereof to cause said plow member to vibrate.

References Cited

UNITED STATES PATENTS

| | | | |
|---|---|---|---|
| 939,132 | 11/1909 | Hubert | 172—40 |
| 2,588,918 | 3/1952 | Graham | 172—413 X |
| 2,792,769 | 5/1957 | Harshberger | 172—40 |
| 2,935,140 | 5/1960 | Talbert | 172—118 |
| 3,103,250 | 9/1963 | Lamb | 172—40 |
| 3,106,968 | 10/1963 | Talbert | 172—118 X |
| 3,211,236 | 10/1965 | Patton | 172—40 |

FOREIGN PATENTS

| | | |
|---|---|---|
| 5,123 | 1/1928 | Australia. |
| 369,256 | 2/1923 | Germany. |

ABRAHAM G. STONE, *Primary Examiner.*

ANTONIO F. GUIDA, *Examiner.*

R. L. HOLLISTER, *Assistant Examiner.*